June 2, 1959 — N. MILLER — 2,889,432
CONTROL DEVICE
Filed Nov. 27, 1957 — 2 Sheets-Sheet 1

INVENTOR.
NICHOLAS MILLER
BY
ATTORNEY

June 2, 1959  N. MILLER  2,889,432
CONTROL DEVICE
Filed Nov. 27, 1957  2 Sheets-Sheet 2
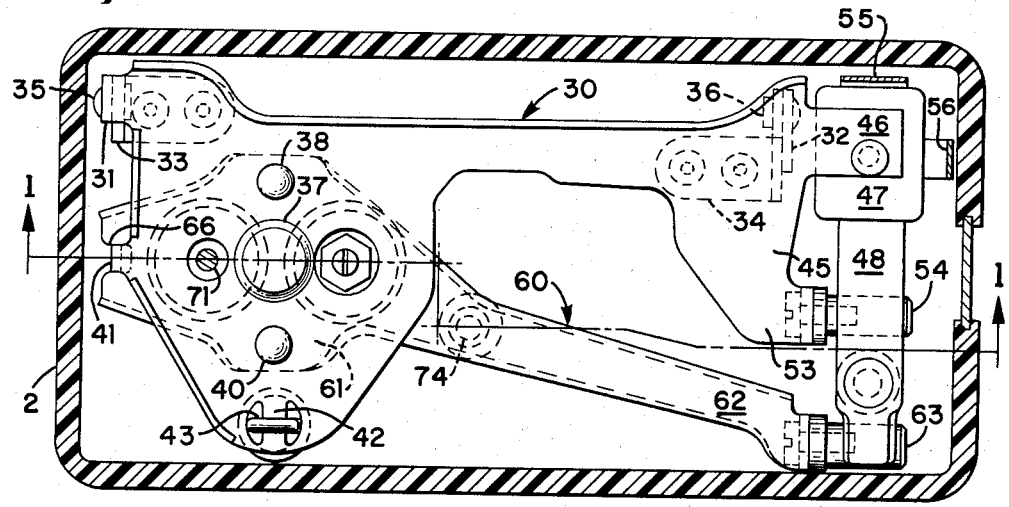
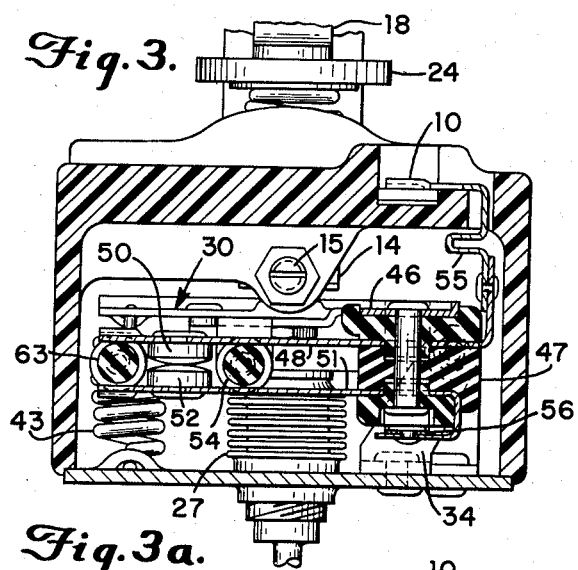
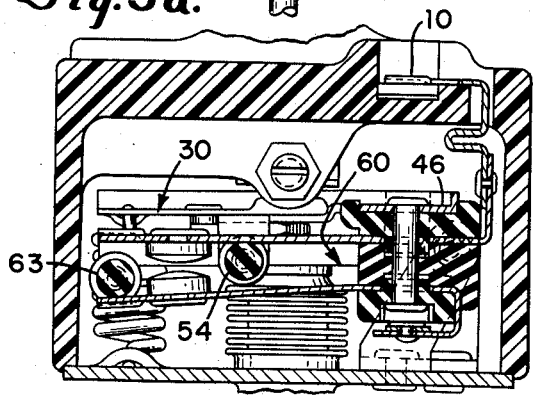
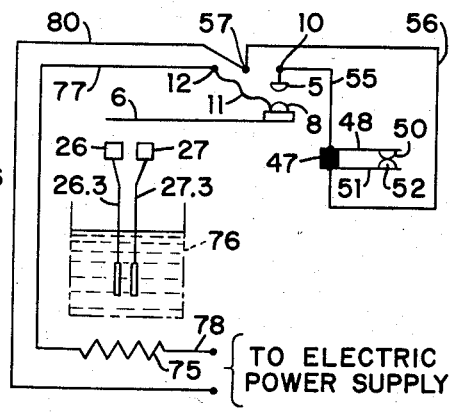
INVENTOR.
NICHOLAS MILLER
BY
Andrew B. Hubbard
ATTORNEY 100
United States Patent Office 2,889,432
Patented June 2, 1959

2,889,432

CONTROL DEVICE

Nicholas Miller, Chicago, Ill., assignor to General Electric Company, a corporation of New York Application November 27, 1957, Serial No. 699,264

15 Claims. (Cl. 200—140)

This invention relates to control devices, and, in particular, to a control device having a first control means which cycles the supply of energy to a body according to departure of the energy state of the body from a pre-established standard; and a second control means which operates independently to control the supply of energy upon the occurrence of an abnormal condition either of the energy state or of the control apparatus.

For example, it may be desired to cycle the energy input to an apparatus within limits which will maintain a desired differential between two remote portions of the apparatus but will interrupt the energy supply if there is an abnormal departure from the desired differential. As a second example, it may be desired to use a thermostatic device to maintain the temperature of a body or mass of material, such as an inflammable oil, within a predetermined safe working range and to protect against a thermostatic system failure which would effect a continuous heat input to the material and thus dangerously increase its temperature.

The present invention provides means for simply and effectively attaining these primary objectives. In a presently preferred form, the invention comprises a main cycling control such as a make-and-break switch for electrically controlling an energy source. For example, the switch may be a series switch in the electric energy circuit for a resistance heating device, or in the electric energy circuit for a solenoid-operated fuel valve, or in the electric energy circuit for a motor-driven pump or the like. The invention also contemplates a secondary control switch in series with the first, and the two switches are so related that under abnormal conditions the second switch will assume an open circuit status regardless of the operating condition of the first switch, whereupon the energy supply to the work device is interrupted. A convenient and practical means of relating the respective control switches is by a pair of expansible chambers arranged in side-by-side relationship in a housing, and having means whereby they independently but uniformly expand and contract when the conditions to which the chambers are responsive are according to a certain standard. For temperature control, the chambers comprise elements of independent thermosensitive systems, whereupon desired standard departure from a predetermined temperature to which the respective temperature-sensing elements are exposed will effect a uniform and conjoint movement of the chambers. The movement of the chambers is translated into operation of the first switching means by way of a mechanism embodying two superimposed and mechanically related lever systems. Specifically, a first lever pivoted relative to a casing within which the chambers are mounted and the primary switching means is contained, is directly associated with said switching means to open or close the contacts thereof according to the direction of movement of the lever. This first lever carries the second switch means, which preferably comprise a pair of superimposed spring leaf contacts normally biased so that the contacts carried thereby are in closed circuit engagement. A second lever system is interposed between the first lever and the expansible chambers and is directly engaged by the chambers. This second lever has an insulated finger which extends between the spring leaf contacts without disturbing the mutual engagement of the contacts carried thereby. The respective first and second levers are in an articulated relationship pursuant to which the conjoint and equal operation of the chambers against the second lever effects uniform movement of the two lever systems as a unit. Thus, the second switch means and the second lever system move conjointly and to the same extent whereby the relationship of the insulated finger and the switch contacts is not disturbed and the contacts remain closed. The first switch means, however, is cycled according to the direction of movement of the lever systems. In the circumstance that the respective chambers expand or contract unequally—that is, if there is a differential movement of one relative to the other—the second lever system against which the chambers operate will of itself have a differential movement relative to the first lever system and the switching means carried thereby, with the result that the movement of the insulated finger relative to the switch contacts will enforce a separation thereof with resulting interruption of the electrical circuit regardless of the circuit condition of the primary switch contacts. Such differential chamber action would occur if one of the thermostatic systems were suddenly subjected to a temperature differential relative to the other system which was beyond the desired differential; or if, for example, there was a complete failure of the thermostatic system which caused the associated chamber to collapse. The possibility exists, of course, that each system may simultaneously fail and each chamber simultaneously and uniformly collapse; and to accommodate even this remote situation, means are provided to open the second switch contacts, as hereinafter described.

Other features and advantages of the invention will be apparent from the following detailed description of a presently preferred embodiment thereof, read in connection with the accompanying drawings in which:

Fig. 3 is a vertical elevation looking in the direction of the arrows 3—3 of Fig. 1;

Fig. 3a is a view similar to Fig. 3 but illustrating the "emergency" operating condition of the control device;

Fig. 4 is a horizontal plan section looking in the direction of the arrows 4—4 of Fig. 1; and Fig. 5 is a schematic view of the device in a typical control application.

Figure 1:
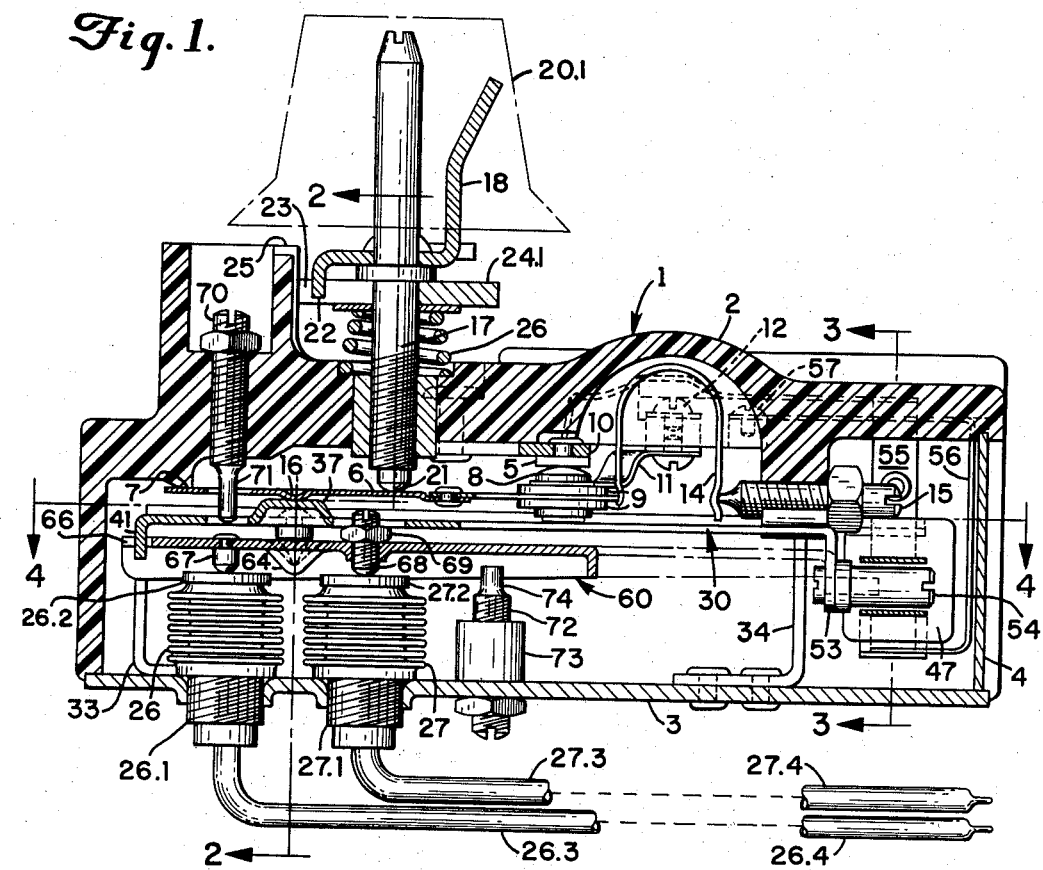
Fig. 1 is a side sectional elevation of a control device embodying the invention, taken along the arrows 1—1 of Fig. 4.

Referring first to Fig. 1, the control device 1 embodying the invention is illustrated as a temperature control apparatus, although as well understood in the art, almost identical structure is employed in pressure control devices. The apparatus comprises a housing 2 of which the major portion is of a molded plastic such as a phenol condensation product; a metal base plate 3 and an end closure 4 are removably associated to provide a fully enclosed structure. A fixed contact 5 is suitably mounted in the insulated housing part; said contact is part of a first electric switch system which includes a flexible blade 6 suitably pivotally mounted on the fulcrum projection 7 of the housing and carrying at the opposite end a contact 8. It will be understood that the contact 8 is completely electrically insulated from the blade 6 as by the insulating plates 9. The fixed contact 5 is carried by a rigid terminal element 10 and contact 8 is connected by way of a light and very flexible conductor strip 11 to a terminal connection 12. A C-shaped overthrow spring 14 is interposed between the free end of the flexible blade 6 and the amplitude adjustment screw 15. The blade 6 is dimpled at 16 to receive the thrust of the thermostat system, as presently explained, and there is provided an adjustable screw 17 having its shaft fitted within a finger 18 which suitably engages the underside of a control knob 20 in a manner whereby rotation of the knob adjusts the axial position of the rounded end 21 of the screw relative to the blade 6. The finger 18 has a lug 22 which enters a slot 23 in a plate 24; said plate is essentially an indexing device, an extension of which will engage a stop 25 provided on the housing to establish the extremes of rotation of the screw 17. The spring 24.1 merely interposes frictional resistance for maintenance of the adjustment. The foregoing elements are all conventional in the thermostat art and as such are not patentably significant. In order to simplify the number and arrangement of the figures, no attempt has been made to show the precise relationship of the terminals 10 and 12; said terminal members are schematically shown in their relation to the two switching circuits, in Fig. 5. It should also be understood that frequently a primary thermostat switching system embodies a double pole, single throw contact system and that the single pole arrangement indicated in Fig. 1 is not in any sense a limitation.

The invention depends importantly for its operation on two interrelated thermosensitive systems. As shown, the systems comprise conventional expansible chambers 26 and 27, each of which has a threaded base supporting its chamber on the plate 3, as well as a head portion which comprises its operating end. The base plate 3 therefore establishes the datum plane relative to which the operating heads of the thermostats move. As shown, the respective bases and heads are identified as 26.1 and 26.2 for the chamber 26 and as 27.1 and 27.2 for the chamber 27. Each chamber has a tube connecting it with a temperature-sensitive "bulb"; the tubes are respectively identified as 26.3 and 27.3 and the bulbs are numbered 26.4 and 27.4. The respective thermosensitive systems are designed so that under normal operating conditions, the chambers will expand and contract conjointly and uniformly according to the change in temperature sensed by the bulbs. If each bulb is to be subject to the same temperature, as in one contemplated use of the invention, later described, the thermostatic systems would have the identical filling of a suitable liquid or gas calculated to have a predetermined expansion per degree rise in temperature. On the other hand, if the thermosensitive systems are to be subjected to different temperatures but are to act in concert as the respective temperatures rise and fall in a predetermined relationship, the tube systems will be filled with a liquid or gaseous material having expansion characteristics in its particular operating range which would be productive of equalization of expansion and contraction of the respective chambers. It is also contemplated that the expansion characteristics of the chambers themselves may be adjusted to produce uniform response to the temperature changes to which the thermosensitive bulbs are exposed. In the present example of the invention, it will be assumed that the respective bulbs 26.4 and 27.4 are clamped together or otherwise held in close mutual adjacency so that each is exposed to identical temperature conditions. For example, the bulbs may be submerged in the cooking oil of a fry kettle, such as that shown in U.S. Patent 2,805,314, granted September 3, 1957, to Harold A. Michaelis, for "Frying Apparatus" and assigned to the assignee herein.

The principal objective of the thermosensitive systems is to operate the primary electric switch system which comprises the blade 6 and the contacts 5 and 8. In a conventional thermostat, the head of a flexible chamber, such as the head 26.2 of chamber 26, would be in direct engagement with the dimple 16 of the blade 6, whereupon expansion of the chamber would cause the blade to flex upwardly between the fulcrum 7 and the end 21 of the adjustment screw 17. This would obviously drive the free end of the blade downwardly, as viewed in Fig. 1, and as the blade passed through the overcenter position of the spring 14, the contact 8 would break sharply away from the fixed contact 5 to open the electrical circuit controlled thereby. Assuming that opening said circuit would be effective to de-energize a heating element, as in the case of the fry kettle application mentioned above, the cooling down of the cooking oil would effect a contraction of the chamber 26 with resulting reverse operation of the blade 6 and a reclosing of the contacts 5 and 8. As is well known, adjustment of the screw 17 effects the adjustment of the temperature at which the thermostat blade 6 will move between open and closed circuit positions and the bias imposed on the spring 14 by the screw 15 affects the amplitude of the operation.

Figure 2:
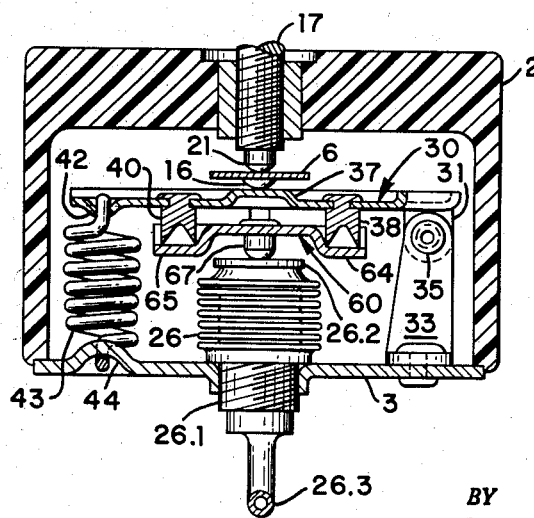
Fig. 2 is a vertical elevation taken in section on lines 2—2 of Fig. 1.

In the present invention, the conjoint and uniform operation of the chambers 26 and 27 is used to control the primary switching means in the usual thermostat manner, but differential operation of the chambers relative to each other will operate a secondary or "safety" switch in the electrical circuit. Accordingly, the mechanism for translating chamber movement into operation of the blade 6 comprises two articulated levers which are interposed between the chambers and the blade 6. The first lever 30 is best shown in Figs. 2 and 4. It is a rigid structure appropriately flanged about at least a substantial portion of its periphery to give it increased strength. It is provided with ears or lugs as at 31 and 32, which pivotally attach to supporting brackets 33, 34 secured to the base plate 3. The respective pivots 35 and 36 are in exact alignment so that lever 30 is free to rotate without binding. The lever 30 has an upwardly formed boss 37 which is precisely centered relative to the axes of the chambers 26 and 27 and is also precisely centered relative to the dimple 16 of the blade 6. Further, the lever 30 has two downwardly extending knife-edge pivots 38 and 40, the edge portions of which are in a line which is precisely centered between the axes of the chambers 26 and 27 and is vertical to a line extending between said axes, as viewed in Fig. 4. The lever 30 has a downwardly extending tab 41 and a lanced-out rib 42 adjacent a side wall of the housing 2. The rib 42 provides for the attachment of a coil spring 43 which is anchored at 44 in the plate 3, as shown in Fig. 2.

The lever 30 has a forked end portion 45, as seen in Fig. 4. An arm 46 thereof securely carries an insulating block assembly 47 which supports in mutually spaced relationship an upper flexible contact strip 48 having a contact 50, and a lower flexible contact strip 51 having a contact 52, as best shown in Fig. 3. The lever 30 thereby carries the secondary switching means, which, of course, will be moved in the direction of movement of the lever. The contact strips 48 and 51 are inherently biased to maintain the contacts in closed circuit relationship. The arm portion 53 of the forked end 45 fixedly carries an insulated pin 54 which projects between the contact strips 48 and 51, substantially filling the space therebetween but not affecting the inherent bias thereof. The contact strips and their associated contacts comprise the secondary switch means as aforesaid and are therefore provided with flexible conductor strips respectively 55 and 56 which make connection with the first switch means, the electric energy circuit and the work device, in a series relationship, as later described. Conductor strip 55 is electrically connected to terminal 10, and strip 56 is connected to a terminal 57, as shown in Fig. 1.

The second lever 60 is disposed intermediate the lever 30 and the chambers 26 and 27 and, as best shown in Figs. 1, 2 and 4, is articulatedly associated with lever 30. Lever 60 has an enlarged end 61 which completely comprehends the area occupied by the chambers 26 and 27 and the knife-edged pivots 38 and 40 and an angular extension 62 which terminates in an insulating pin 63 which projects between the contact strips 48 and 51. It will be understood that the extension 62 is suitably offset so that the pin 63 normally is in the plane of the pin 54 and therefore does not disturb the bias of the contact blades 48 and 51. The portion 61 of lever 60 is formed with the V-shaped pockets 64 and 65 (Fig. 2) within which respectively seat the knife-edged pivots 38 and 40. Additional stability of the lever 60 relative to lever 30 is provided by the extension of the tab 41 into a slot 66 formed in lever 60. Lever 60 mounts two elements which engage the heads of the chambers 26 and 27. These elements comprise the round end stud 67 engaging the head of chamber 26 at the geometrical center thereof and the round end screw 68 engaging the geometrical center of the chamber 27. The screw 68 is provided with a lock nut 69 whereby to permit the lever to be positioned in parallel relationship to lever 30 and secured in such relationship. It will be obvious that as the chambers 26 and 27 expand and contract conjointly and uniformly, the two levers 30 and 60 will move in unison without changing the spatial relationship of one to the other. Lever 30 will pivot about its respective supports 33 and 34 and the contact strips 48 and 51 of the second switch means will follow the rotation of the lever. Spring 43 maintains a resilient engagement of the levers 30 and 60 and the lever 60 therefore follows the action of lever 30, whereby under normal operating conditions the pin 63 interposed between the contact strips 48 and 51 will not change its position relative to the pin 54 carried by lever 30. The contacts 50 and 52 will therefore remain in engagement and the only effect of the conjoint movement of the levers 30 and 60 is to bias the blade 6 into operation of the primary switch contacts 5 and 8 according to the direction of movement. If, however, either of the chambers 26 and 27 expands or contracts in a differential relation to the other, the lever 60 will rock about the pivots 38 and 40 and the end 62 of the lever will raise or lower relative to the end 45 of the lever 30. This will produce movement of pin 63 relative to pin 54 and the contacts 50 and 52 will separate. Assuming that the head 27.2 of chamber 27 took a position lower than the head 26.2 of chamber 26, which would occur if chamber 26 expanded unequally as respects chamber 27, or if chamber 27 contracted more than chamber 26, lever 60 would incline downwardly relative to lever 30, for the spring 43 acting on lever 60 by way of the pivots 38 and 40 would enforce a rotation of lever 60 about the stud 67 which rests upon the head 26.2. This would produce the downward movement of pin 63 relative to pin 54, shown in Fig. 3a. On the other hand, if head 26.2 dropped relative to head 27.2, the lever 60 would rotate upwardly about screw 68 with the resulting upward movement of pin 63 relative to pin 54 and a similar separation of the contacts 50 and 52. The pin 54 prevents contact spring 48 from moving downwardly to maintain the engagement of contacts 50 and 52.

The control device also provides for an overtemperature cut-out and a safety provision against a situation in which both of the bellows 26 and 27 collapsed simultaneously, as they would if the tube systems thereof were simultaneously severed. An overtemperature situation may arise, for example, if the primary switch contacts became fused together. The chambers 26 and 27 would nevertheless expand uniformly as the common temperature of their thermostatic bulbs increased and there would be no differential action of the chambers to effect the separation of the contacts 50 and 52. This undesirable condition is corrected in the present invention by the employment of a screw 70 mounted in the housing portion 2 and having the reduced diameter extension 71 which passes through appropriate openings in the blade 6 and lever 30 to terminate above the stud 67. If, for example, the temperature of the cooking oil in a fry kettle should not substantially exceed 475° F., the screw 70 would be adjusted and secured so that at about 460° F. the stud 67 would strike the end portion 71 of the screw, whereupon only chamber 27 could continue its expansion and upon doing so would tilt the lever 60 upwardly and open the contacts 50 and 52 as aforesaid.

Protection against simultaneous failure of both of the thermosensitive systems is provided by means of the screw 72 extending through a sleeve 73 in the bottom plate 3. Said screw has its extension 74 disposed beneath the lever 60, as appears in Fig. 4. This screw is adjusted and secured so that if both of the tube systems were to spring a leak, in which event the spring 43 would effect the simultaneous collapse of the chambers 26 and 27, the lever 60 will strike the end of the screw whereupon continued collapse of the bellows would enforce an upward rotation of lever 60 to effect a separation of the contacts as aforesaid. As a practical matter, the screw 72 is adjusted and secured so that upon a collapse of the chambers to the extent represented by a temperature equivalent to about 25° F. below the lowest expected temperature of the room in which the thermostat is operating, the above described action will occur.

Fig. 5 schematically shows a typical wiring diagram for the use of the invention to control the electric energy circuit supplying the heating element 75 of a fry kettle 76 in the oil content of which the thermostatic bulbs are immersed in close side-by-side relationship. The heating element 75 is connected by way of conductor 77 to the terminal 12 of contact 8; and conductor 78 connects the opposite terminal of the heating element to one side of a suitable electric power supply line. Contact 5 is connected to spring contact element 48 by way of terminal 10 and lead 55 and contact element 51 is connected by way of lead 56, terminal 57, and conductor 80 to the other side of the power supply. It is seen, therefore, that contacts 5 and 8 and contacts 50 and 52 represent series connected switches, and that the opening of either contact pair will interrupt the circuit to the heating element. The primary switch contacts 5 and 8 are, of course, the ones which cycle under normal operation; the contacts 51 and 52 of the secondary switch means open only under abnormal conditions, as above described.

While there has been described what is at present considered to be the preferred embodiment of the invention, it will be understood that various modifications may be made therein, and it is intended to cover in the appended claims all such modifications as fall within the scope of the invention.

I claim:

1. Apparatus for controlling the application of heat energy to a body, comprising a housing, two substantially identical thermosystems, each comprising a bulb disposed within said body, an expansible and contractible chamber in said housing, a capillary tube connecting said bulb and said member, and a thermoresponsive fluid within said bulb, capillary tube and expansible and contractible chamber, said bulbs being in closely adjacent locations within said body so as identically to sense the temperature change thereof for producing identical expansion and contraction of said chambers upon temperature change in the body, a first set of contacts providing a switch in a circuit controlling the heat energy to said body, a second set of contacts providing a normally closed switch in series with said first-named switch, switch actuator means movable by the expansion or contraction of said chambers for operating said first-named switch between open and closed circuit positions, a first lever hinged within said housing and having means including flexible conductor strips for mounting said second set of contacts whereby said lever moves said contacts as a unit, a second lever extending across said expansible and contractible chambers in engagement therewith and having a member interposed between the said flexible conductor strips of said second switch, means mechanically interconnecting the respective levers for conjoint movement to maintain uniform direction and magnitude of movement of said levers and of said conductor strips and the member interposed therebetween so long as said expansible and contractible chambers operate in a substantially identical manner, and means for mounting said second lever for tilting movement relative to said first lever in the circumstance of dissimilar operation of said chambers, whereby to effect displacement of the conductor strips carried by said first lever relative to the second-lever member disposed therebetween, with resulting separation of the second set of switch contacts.

2. Apparatus according to claim 1, in which the first and second levers are arranged one above the other, and said first lever is in engagement with said switch actuator means whereby actuation thereof is the result of conjoint movement of said levers.

3. Apparatus according to claim 1, in which said first and second levers are interposed between said chambers and said switch actuator means and said first lever is pivotally mounted on said second lever in continuous resilient engagement therewith.

4. Apparatus according to claim 1, in which said first lever has a forked end portion the members of which respectively mount said flexible conductor strips in insulated space relative and an insulating pin projecting between said conductor strips intermediate the conductor strip mounting means and the interposed member carried by said second lever.

5. Apparatus according to claim 1, in which the member carried by said second lever and interposed between said conductor strips comprises an insulated pin having a diameter substantially equal to but not greater than the spacing between said conductor strips.

6. Apparatus for controlling the application of energy to a body, comprising a housing, two substantially identical expansible and contractible chambers conjointly and uniformly responsive to the change in the energy state of said body, said chambers being arranged to produce identical expansion or contraction according to the direction of change in the energy state of said body, a first pair of contacts providing a switch in a circuit controlling the application of energy to said body, a second pair of contacts providing a normally closed switch in series with said first-named switch, means operated conjointly by said expansible and contractible chambers for operating said first-named switch between open and closed circuit positions, a lever hinged relative to said chambers, said lever having means including parallel, mutually insulated, resilient conductor strips for supporting said second pair of contacts for movement as a unit with said lever, means mechanically engaging said chambers and said lever and responsive to conjoint, uniform movement of said chambers to urge said lever into rotation while maintaining a fixed spatial relationship with said lever, an insulating pin extending from said last-named means between the said flexible conductor strips, and means for mounting said last-named means for displacement relative to said lever in the circumstance of dissimilar operation of said chambers to effect displacement of said insulating pin relative to said conductor means to spread said conductor means into open circuit relation of the contacts carried thereby.

7. Apparatus for controlling the temperature of a body to be heated, comprising a housing located externally of said body, a pair of thermosensitive systems, each system including a temperature sensitive bulb in said body, an expansible and contractible chamber in said housing, and a capillary tube connecting said chamber and said bulb, each said thermosensitive system having an identical thermoresponsive fluid filling said chambers being matched for substantially identical performance in response to uniform activity of the thermosensitive fluid in the respective systems, a first pair of cooperating control elements in the housing movable into or out of engagement to regulate the supply of heat to said body, means within said casing responding to a substantially uniform expansion and contraction of said chambers to move said cooperating control elements into or out of engagement, a second pair of control elements in the housing movable into or out of engagement to regulate the supply of heat to said body, and means within said casing interposed between said chambers and said first-named control element moving means and responsive to an unequal expansion or contraction of the one of said chambers relative to the other to operate said second pair of control elements to interrupt the supply of heat to said body.

8. Apparatus for controlling the application of energy to a body, comprising a housing located externally of said body, a pair of devices individually responsive to changes in the energy state of said body, each of said devices having an expansible chamber in said housing and means whereby said chambers expand or contract uniformly relative to a common datum according to the extent and direction of change in the energy state of said body, a first and a second electric switch means disposed in said housing and in series electrical connection to control the application of energy to said body, said second electric switch being biased into one electric circuit establishing position, a first lever system for translating conjoint, uniform movement of said chambers into action of said first switch means without changing the operating status of said second switch means, and a second lever system interposed between said chambers and said first lever system responsive to the displacement of one of said chambers relative to the other to actuate said second switch means from its normal to another operating status.

9. Apparatus according to claim 8 in which said second switch means is biased to assume a condition favorable to the application of energy to said body.

10. Apparatus for controlling the temperature of a body which receives heat from a source of thermal energy, comprising two independent thermosensitive systems each of which is responsive to the change in temperature of said body, said thermosensitive systems each having an element movable relative to a common datum according to the increase or decrease of said body temperature, first electric switch means to control the supply of thermal energy to said body, second electric switch means in series electrical connection therewith, said second switch means being in normally closed circuit status, means for operating said first switch means between open and closed circuit positions according to the direction of conjoint, uniform movement of said movable elements relative to said datum, means responsive to a differential movement of one element relative to the other to operate said second switch means to open circuit position, and means responsive to a conjoint uniform movement of the respective elements in a predetermined direction to operate said second switch means to open circuit position.

11. Apparatus for controlling the temperature of a body which receives heat from a source of thermal energy, comprising two thermosensitive systems each of which is responsive to a change in temperature of said body, each of said thermosensitive systems having an element which moves in the same direction and to substantially the same extent in response to a predetermined relationship of the body temperature changes to which the respective thermosensitive systems are subject, first electric switch means to control the supply of thermal energy to said body, second electric switch means in series electrical connection therewith, means for biasing said second switch means to closed circuit condition, first and second lever means common to the respective thermosensitive system elements and responsive to conjoint movement of said elements in uniform direction and between predetermined limits to operate said first switch means to open or closed circuit condition according to the direction of such movement relative to said datum while maintaining said second switch in its closed circuit condition; means responsive to the conjoint movement of said elements in either direction beyond predetermined limits to rotate one of said lever means relative to the other, and means effective upon predetermined movement of said one lever means operate said second switch to open circuit condition.

12. Apparatus for controlling the application of energy to a body, comprising a housing, two substantially identical expansible and contractible chambers disposed in side-by-side relationship within said housing, said chambers being conjointly and uniformly responsive to a change in energy state of the body and further adapted to produce identical expansion or contraction according to the direction of change in the energy state of the body, an electrical circuit for effecting supply of energy to said body, switch means in series electrical connection with said circuit, means for resiliently biasing said switch means into a closed circuit condition, lever means pivotally mounted within said housing and in continuous engagement with said chambers for movement thereby, a member carried by said lever means and disposed in close proximity to said switch biasing means, means for effecting movement of said switch biasing means without affecting the electrical condition of said switch means during conjoint and uniform expansion of said chambers, stop means fixed with respect to said housing for limiting the expansion of one of said chambers, and means effective upon continued expansion of the other of said chambers to enforce a rotating of said lever means and the member carried thereby to bring said member into engagement with said switch biasing means to cause said biasing means to open the said switch means to interrupt the said energy-supplying electric circuit.

13. Apparatus for controlling the application of energy to a body, comprising a housing, two substantially identical expansible and contractible chambers fixed therein and conjointly and uniformly responsive to a change in energy state of the body and further adapted to produce identical expansion or contraction according to the direction of change in the energy state of the body, an electrical circuit for effecting supply of energy to the body, switch means in series electrical connection with said circuit, means for resiliently biasing said switch means into one electrical condition, lever means pivotally mounted within said housing and in continuous engagement with said chambers for movement thereby, a member carried by said lever means and disposed in close proximity to said switch biasing means, means responsive to conjoint movement of said chambers to a predetermined extent in one direction to move said biasing means and said member conjointly without effecting a change in the operating condition of said switch means, and stop means engageable with said lever means upon conjoint movement of said chambers in said direction beyond the said predetermined extent to enforce an engagement of the said member with said switch biasing means to cause said biasing means to change the operating condition of said switch.

14. Apparatus for controlling the application of energy to a body, comprising a housing, two substantially identical expansible and contractible chambers fixed therein and conjointly and uniformly responsive to a change in energy state of the body and further adapted to produce identical expansion or contraction according to the direction of change in the energy state of the body, a pair of switch contacts in series electrical connection in an electrical circuit supplying energy to said body, means for resiliently biasing said switch contacts into a predetermined electric circuit relationship, lever means pivotally mounted within said housing and in continuous engagement with both of said chambers for movement thereby, an insulating member carried by said lever means and engaging said switch contact biasing means, means for effecting conjoint movement of said biasing means and said insulating member during conditions of uniform expansion or contraction of said chambers to maintain said switch contacts in said predetermined circuit relation during such conjoint movement, and means effective upon dissimilar expansion or contraction of said chambers for displacing said insulating member relative to said biasing means for enforcing an opposite electric circuit relationship of said switch contacts.

15. Control apparatus, comprising, in combination, a pair of devices having elements movable relative to a common datum in response to changes in an external condition to which said devices are exposed, electrically controllable means for effecting such condition and including electric switch means operable by conjoint and uniformly applied action of each of said movable elements thereagainst, second switch means in series electrical connection with said first-named switch means, and means common to the said movable elements and responsive to a differential movement of one of said elements relative to the other to operate said second switch means to open circuit position.

References Cited in the file of this patent

UNITED STATES PATENTS

| 2,492,675 | Yeida | Dec. 27, 1949 |
| 2,506,623 | Williams | May 9, 1950 |
| 2,520,370 | Offutt | Aug. 29, 1950 |
| 2,671,838 | Senn | Mar. 9, 1954 |
| 2,758,178 | Eskin | Aug. 7, 1956 |

UNITED STATES PATENT OFFICE
CERTIFICATE OF CORRECTION

Patent No. 2,889,432                                                              June 2, 1959

Nicholas Miller

It is hereby certified that error appears in the printed specification of the above numbered patent requiring correction and that the said Letters Patent should read as corrected below.

Column 7, line 25, for "relative" read -- relation --.

Signed and sealed this 6th day of October 1959.

(SEAL)
Attest:

KARL H. AXLINE                                            ROBERT C. WATSON
Attesting Officer                                         Commissioner of Patents